United States Patent
Assem et al.

(10) Patent No.: US 8,761,725 B2
(45) Date of Patent: Jun. 24, 2014

(54) SYSTEM AND METHOD FOR PERFORMING A TELECOMMUNICATION SERVICE

(75) Inventors: Amr Assem, Cairo (EG); Wael Metwally, Cairo (EG); Mohamed Abd El Wahab, Cairo (EG); Hisham Sabry, Cairo (EG)

(73) Assignee: Telecomax Group, Cairo (EG)

(*) Notice: Subject to any disclaimer, the term of this patent is extended or adjusted under 35 U.S.C. 154(b) by 306 days.

(21) Appl. No.: 13/287,917

(22) Filed: Nov. 2, 2011

(65) Prior Publication Data

US 2012/0108201 A1    May 3, 2012

Related U.S. Application Data

(60) Provisional application No. 61/409,477, filed on Nov. 2, 2010.

(51) Int. Cl.
*H04M 11/00* (2006.01)

(52) U.S. Cl.
USPC .......... 455/406; 455/405; 455/407; 455/408; 455/409; 455/414.1; 379/88.18; 379/88.19; 379/121.02; 379/221.11; 379/221.09

(58) Field of Classification Search
USPC ......... 455/405–409, 414.1; 379/88.18, 88.19, 379/121.02, 221.11, 221.09
See application file for complete search history.

(56) References Cited

U.S. PATENT DOCUMENTS

| | | | | |
|---|---|---|---|---|
| 7,499,995 | B2* | 3/2009 | Armstrong | 709/224 |
| 2008/0125077 | A1* | 5/2008 | Velazquez et al. | 455/404.2 |
| 2009/0214007 | A1* | 8/2009 | Van Wyk et al. | 379/88.19 |

* cited by examiner

*Primary Examiner* — Olumide T Ajibade Akonai
(74) *Attorney, Agent, or Firm* — Osha Liang LLP

(57) ABSTRACT

A method for performing a telecommunication service, including identifying, on a Service Delivery Platform (SDP) and by a processor, the telecommunication service, selecting, on the SDP and by the processor, the telecommunication service, and executing, on the SDP and by the processor, the telecommunication service on a cellular network, where the SDP is configured to implement the telecommunication service on the cellular network.

4 Claims, 14 Drawing Sheets

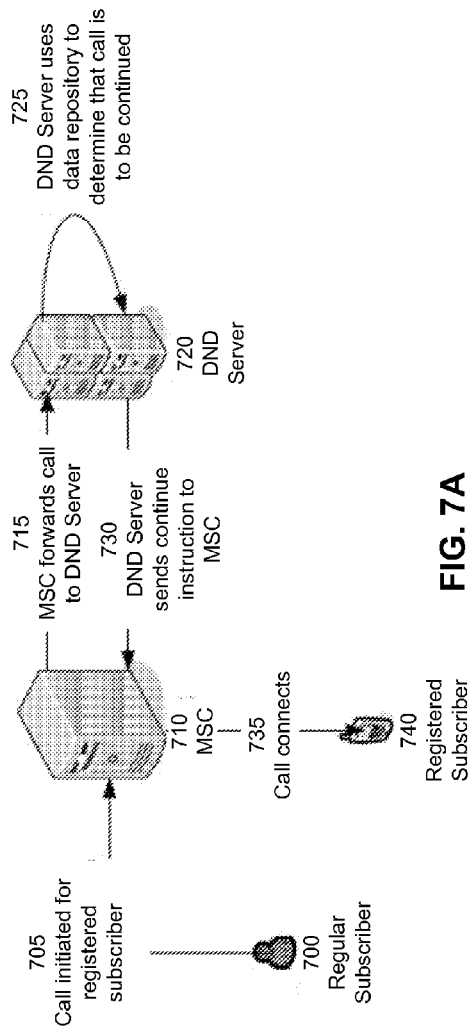
FIG. 7A
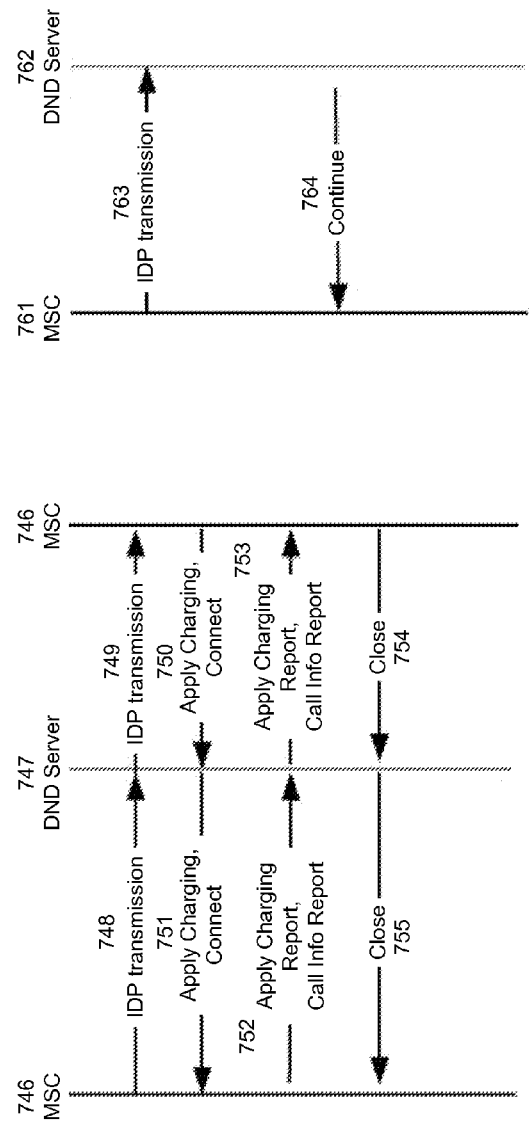
FIG. 7B
FIG. 7C

| Sl. no | Type | Impacted network element on SS7 | Estimated price impact of network change | BIC platform price | Addition of point of failure during call | Delay in providing bonus |
|---|---|---|---|---|---|---|
| 1 | IN CDR | MSC & IN | High | Mid-low | No | Mid |
| 2 | INAP /CAP | MSC (minor impact on IN) | Mid | High | Yes | No delay |
| 3 | MSC CDR | None | Low | Mid | No | Mid |

* In all scenario additional capacity to add bonus on IN over IP interface is required

FIG. 9D

SYSTEM AND METHOD FOR PERFORMING A TELECOMMUNICATION SERVICE

CROSS-REFERENCE TO RELATED APPLICATIONS

This application claims priority pursuant to 35 U.S.C. §119 (e), to the filing date of U.S. Patent Application Ser. No. 61/409,477, entitled "MOBILE SOFTWARE SERVICES FOR TELECOM OPERATORS", filed on Nov. 2, 2010, and assigned to the assignee of the present application. Further, U.S. Patent Application Ser. No. 61/409,477 is hereby incorporated by reference.

BACKGROUND

Telecommunication providers are companies that provide networks for landline phones, mobile devices, IP devices, radios, and various other types of communications. Telecom services may encompass any services provided by a telecommunication provider. In other words, telecom services are a specified set of user information transfer capabilities provided to a group of subscribers of the telecom service by a telecommunication provider. Telecommunication service users are typically responsible for the information content of messages. The telecommunication service provider typically has the responsibility for the acceptance, transmission, and delivery of messages.

SUMMARY

In general, in one aspect, the invention relates to a system for performing a telecommunication service, comprising a cellular network; a processor operatively connected to a memory; a Service Delivery Platform (SDP) configured to implement the telecommunication service on the cellular network, wherein the telecommunication service is a Do Not Disturb Service interacting with the SDP and configured to block calls; a Message Service Center (MSC) configured to obtain, in a first message from a mobile device, a first phone number to whitelist, wherein the mobile device is registered with a call screening service, receive, after activating a whitelist, a second message for the mobile device from a second phone number, and discard, by the processor, the second message based on a failed search; and a Do Not Disturb (DND) Server configured to store the first phone number in the whitelist, wherein the whitelist comprises a plurality of phone numbers allowed to contact the mobile device, activate, by the processor, the whitelist, and search, by the processor, the whitelist for the second phone number to generate the failed search.

In general, in one aspect, the invention relates to a system for performing a telecommunication service, comprising a cellular network; a processor operatively connected to a memory; a Service Delivery Platform (SDP) configured to implement the telecommunication service on the cellular network, wherein the telecommunication service is a Bulk Messaging Service interacting with the SDP and comprising a web interface for sending bulk messages; a Bulk Messaging Platform (BMP) configured to obtain a plurality of business rules for transmitting a plurality of bulk messages, wherein the plurality of business rules comprises a blackout time for the plurality of bulk messages and a throughput restriction for the plurality of bulk messages, and wherein the plurality of business rules are obtained from an Internet user interface accessed by an administrator; and a Message Service Center (MSC) configured to obtain, from BMP, a request from the user to transmit a bulk message, wherein the request comprises a plurality of recipients and a message content, and transmit, within the throughput restriction, the message content to each of the plurality of recipients based on the request, wherein the message content is sent outside of the blackout time.

In general, in one aspect, the invention relates to a system for performing a telecommunication service, comprising a cellular network; a processor operatively connected to a memory; a Service Delivery Platform (SDP) configured to implement the telecommunication service on the cellular network, wherein the telecommunication service is a Bonus on Incoming Call (BIC) Service interacting with the SDP and configured to calculate and apply the bonus on incoming calls; an Incoming Call Bonus (ICB) Platform configured to obtain a plurality of business rules for receiving bonuses on incoming calls, collect a plurality of bonus parameters from a phone call, wherein the plurality of bonus parameters comprises a call length, and calculate a bonus for a mobile device based on the plurality of business rules and the plurality of bonus parameters; a Message Service Center (MSC) configured to identify the phone call directed to the mobile device, wherein the mobile device is eligible to receive bonuses on incoming calls; and an Intelligent Network (IN) configured to credit an account of the mobile device with the bonus.

In general, in one aspect, the invention relates to a system for performing a telecommunication service, comprising a cellular network; a processor operatively connected to a memory; a Service Delivery Platform (SDP) configured to implement the telecommunication service on the cellular network, wherein the telecommunication service is a Traffic Regulator Service interacting with the SDP and configured to regulate call traffic on the cellular network; a Message Service Center (MSC) configured to detect a call in a network; and a Traffic Regulator (TR) System configured to determine that a time of the call is within a range of hours, determine that a type of the call is voice, determine that a location of the call is local, identify a call number of the call, determining, using the call number, that the call originates from within the network, determine that a percentage of the network available is less than a threshold, and drop, based on the percentage of the network available, the call from the network.

In general, in one aspect, the invention relates to a method for performing a telecommunication service, comprising identifying, on a Service Delivery Platform (SDP) and by a processor, the telecommunication service, selecting, on the SDP and by the processor, the telecommunication service, and executing, on the SDP and by the processor, the telecommunication service on a cellular network, wherein the SDP is configured to implement the telecommunication service on the cellular network.

Other aspects of the invention will be apparent from the following description and the appended claims.

BRIEF DESCRIPTION OF DRAWINGS

FIG. 7A shows an alternate do not disturb system in accordance with one or more embodiments of the invention.

FIGS. 7B and 7C show timelines for the alternate do not disturb system in accordance with one or more embodiments of the invention.

FIG. 9D shows a comparison chart for the systems for awarding bonuses on incoming calls in accordance with one or more embodiments of the invention.

DETAILED DESCRIPTION

Figure 1:
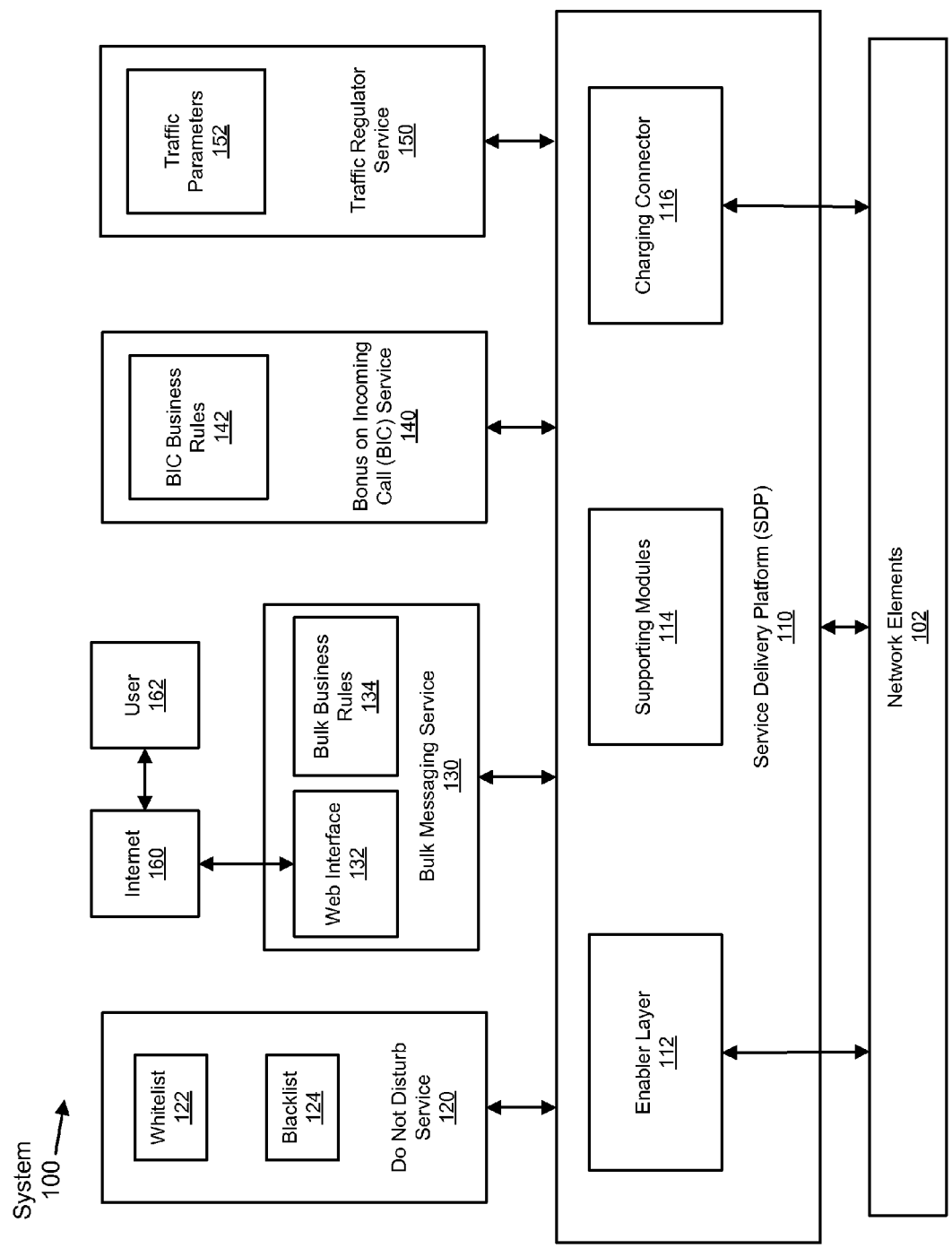
FIG. 1 shows a system for providing telecommunication services in accordance with one or more embodiments of the invention.

Presently preferred embodiments of the invention are shown in the above-identified figures and described in detail below. In describing the preferred embodiments, like or identical reference numerals are used to identify common or similar elements. The figures may be shown exaggerated in scale or in schematic in the interest of clarity and conciseness.

It will be understood from the foregoing description that various modifications and changes may be made in the preferred and alternative embodiments of the present invention without departing from its true spirit.

In general, embodiments of the invention provide mobile software services for telecom operators. Specifically, a Service Delivery Platform (SDP) is provided, as are systems and methods for do not disturb, bulk messaging, and bonuses on incoming calls.

FIG. 1 shows a system for providing telecommunication services in accordance with one or more embodiments of the invention. As shown in FIG. 1, the System (100) includes Network Elements (102), a Service Delivery Platform (SDP) (110), a Do Not Disturb Service (120), a Bulk Messaging Service (130), a Bonus on Incoming Call (BIC) Service (140), and a Traffic Regulator Service (150). The SDP (110) includes an Enabler Layer (112), Supporting Modules (114), and a Charging Connector (116). The Do Not Disturb Service (120) includes a Whitelist (122) and a Blacklist (124), the Bulk Messaging Service (130) includes a Web Interface (132) and Bulk Business Rules (134), the Bonus on Incoming Call (BIC) Service (140) includes BIC Business Rules (142), and the Traffic Regulator Service (150) includes Traffic Parameters (152). Additionally, FIG. 1 includes the Internet (160) and a User (162). Each of the aforementioned components of FIG. 1 is discussed in detail below.

The System (100) may be connected to, or part of, any cellular or telecommunication network, and may be controlled or owned by one or more entities. In one or more embodiments of the invention, the Network Elements (102) may include a variety of components such as a short message service center (SMSC), an unstructured supplementary service data (USSD) gateway, a signaling system no. 7 (SS7) network, a charging system, an intelligent network (IN), subscriber mobile devices, and/or any other suitable element(s). It will be apparent to one of ordinary skill in the art that this is not an exhaustive listing of all possible components of the Network Elements (102) and accordingly, the scope of the invention should not be limited by the above examples.

The Service Delivery Platform (SDP) (110) is a framework on which a variety of telecommunication services may be built, and enables communication with multiple protocols and elements of existing telecommunication networks. In one or more embodiments of the invention, the SDP (110) may reside on and execute on multiple servers, nodes, computers, laptops, or other suitable devices. Alternatively, the SDP (110) may reside on a single device. The SDP (110) is communicatively connected to the Network Elements (102), the Do Not Disturb Service (120), the Bulk Messaging Service (130), the BIC Service (140), and the Traffic Regulator Service (150). In one or more embodiments of the invention, the SDP (110) may be a component of a cellular network. Although not shown in FIG. 1 for simplicity, all components of the SDP (110) are communicatively connected with each other.

One element of the SDP (110) is the Enabler Layer (112). The Enabler Layer (112) is communicatively connected to the Network Elements (102) and is able to support communication across a broad spectrum of protocols and formats including, but not limited to: SS7 networks (for communicating with a message service center (MSC), an IN, or signal transfer points (STP)), hypertext transfer protocol (HTTP), short message peer-to-peer (SMPP) protocol, and extensible markup language (XML) (for communicating with SMSC, USSD gateways, and others). In one or more embodiments of the invention, the Enabler Layer (112) is able to perform any necessary encoding and decoding, as well as maintain protocol related data. Additionally, the Enabler Layer (112) allows the same service to be offered over multiple channels simultaneously without additional effort. In one or more embodiments of the invention, Enabler Layer (112) may be implemented as multiple separate modules, thereby enabling each module to be configured and altered without disrupting other modules.

Another element of the SDP (110) is the Supporting Modules (114). The Supporting Modules (114) provide a variety of supporting services and functionality to the different elements of the SDP (110). For example, the Support Modules (114) provide startup service configuration, alarm monitoring, status monitoring, statistics, call data records, and other services. In one or more embodiments of the invention, Support Modules (114) may be implemented as multiple separate modules, thereby enabling each module to be configured and altered without disrupting other modules. The Supporting Modules (114) may also allow the SDP (110) to communicate with any databases, or allow communication with value added services (such as the Do Not Disturb Service (120), the Bulk Messaging Service (130), the BIC Service (140), and/or the Traffic Regulator Service (150)).

Another element of the SDP (110) is the Charging Connector (116). The Charging Connector (116) connects to the various charging (i.e. billing) systems of cellular networks, and is communicatively connected to the Existing Network Elements (102). In one or more embodiments of the invention, the Charging Connector (116) is able to support a variety of protocols including, but not limited to: XML, simple object access protocol (SOAP), common object request broker architecture (CORBA), file transfer protocol (FTP), various database languages, and any other suitable protocol used by charging or billing systems of cellular networks. In one or more embodiments of the invention, Charging Connector (116) may be implemented as multiple separate modules, thereby enabling each module to be configured and altered without disrupting other modules.

It will be apparent to one of ordinary skill in the art that the SDP (110) is implemented in a modular design, with one or more modules to handle each component or part, thereby allowing portions of the SDP (110) to be updated or changed without requiring the SDP (110) to shut down or crash. Additionally, it will also be apparent to one of ordinary skill in the art that the SDP (110) is able to handle all lines of communication and communication protocols within one framework or server, rather than needing different frameworks or servers for different lines of communication or protocols.

The Do Not Disturb Service (120) is a value added service that may be built onto and/or interact with the framework of the SDP (110) (or any other framework suitable for supporting such a service), and includes a Whitelist (122) and a Blacklist (124). In one or more embodiments of the invention, the Do Not Disturb Service (120) is communicatively connected to the Network Elements (102), and is communicatively connected with all components of the SDP (110). The Do Not Disturb Service (120) may include a data repository (not shown) or may use a data repository associated with the SDP (110). In one or more embodiments of the invention, the Do Not Disturb Service (120) may execute on its own server, computer, laptop, node, or other suitable device. Alternatively, the Do Not Disturb Service (120) may execute on the same device as SDP (110).

In one or more embodiments of the invention, the Do Not Disturb Service (120) is able to receive messages from subscribers of a cellular network, and sign subscribers up for the service via text message, user interface, phone call, or any other suitable method. The Do Not Disturb Service (120) is responsible for discarding, or blocking, unwanted calls to subscribers. In one or more embodiments of the invention, the Do Not Disturb Service (120) inspects all calls received by a cellular network to determine whether a call should be blocked. It will be apparent to one of ordinary skill in the art that there are multiple ways to determine whether a call should be blocked and, therefore, the invention should not be limited to the above example. In one or more embodiments of the invention, the Do Not Disturb Service (120) may use an SS7 network and its Visitor Location Register (VLR) to determine the location of a mobile device, and whether the mobile device is roaming. It will be apparent to one of ordinary skill in the art that this is not the only way to determine whether a mobile device is roaming and, as such, the invention should not be limited to the above example.

The Do Not Disturb Service (120) includes a Whitelist (122) and a Blacklist (124). The Whitelist (122) is list of phone numbers allowed to contact a subscriber when the subscriber's mobile device is roaming, or otherwise out of network. Similarly, the Blacklist (124) is a list of phone number that is not allowed to contact the subscriber at all. The Whitelist (122) and the Blacklist (124) may be stored in any of a variety of formats, and may be of any length. Alternatively, there may be a limit to how many numbers may be on the Whitelist (122) or the Blacklist (124). In one or more embodiments of the invention, the Whitelist (122) and Blacklist (124) may have varying levels of granularity and/or directionality. For example, a subscriber may be able to specify that a phone number is not allowed to contact them at all, or may block only text messages, only phone calls, only MMS message, and so forth (i.e. granularity). Additionally, a subscriber may indicate that he or she does not wish to receive forwarded phone calls or messages from a subscriber, but will accept direct calls or messages (i.e. directionality). It will be apparent to one of ordinary skill in the art that this is not an exhaustive listing of all possibilities, and accordingly, the invention should not be limited to the above examples. Additionally, the Do Not Disturb Service (120) may be implemented without the SDP (110), or may be implemented using a SDP provided by a third-party supplier, or other entity. It will be apparent to one of ordinary skill in the art that the Do Not Disturb Service (120) may be implemented on any available SDP or without an SDP and, accordingly, the invention should not be limited to any specific configuration.

The Bulk Messaging Service (130) is also a value added service that may be built onto and/or interact with the framework of the SDP (110) (or any other framework suitable for supporting such a service), and includes a Web Interface (132) and Bulk Business Rules (134). In one or more embodiments of the invention, the Bulk Messaging Service (130) is communicatively connected to the Network Elements (102), and is communicatively connected with all components of the SDP (110). The Bulk Messaging Service (130) may include a data repository (not shown) or may use a data repository associated with the SDP (110). In one or more embodiments of the invention, the Bulk Messaging Service (130) may execute on its own server, computer, laptop, node, or other suitable device. Alternatively, the Bulk Messaging Service (130) may execute on the same device as SDP (110).

In one or more embodiments of the invention, the Bulk Messaging Service (130) is configured to send messages to the Networks Elements (102) for ultimate delivery to recipients. The Bulk Messaging Service (130) may send bulk SMS messages, bulk MMS message, bulk voice messages, and bulk messages of any other suitable format. It will be apparent to one of ordinary skill in the art that this is not an exhaustive listing of the kinds of bulk messages that may be sent by Bulk Messaging Service (130) and, accordingly, the invention should not be limited to the above examples. Additionally, the Bulk Messaging Service (130) may be implemented without the SDP (110), or may be implemented using a SDP provided by a third-party supplier, or other entity. It will be apparent to one of ordinary skill in the art that Bulk Messaging Service (130) may be implemented on any available SDP or without an SDP and, accordingly, the invention should not be limited to any specific configuration. The Bulk Messaging Service (130) is able to receive messages from users via the Web Interface (132).

The Web Interface (132) is communicatively connected to a User (162) through the Internet (160). The User (162) may be a subscriber to a cellular network associated with the Bulk Messaging Service (130). Alternatively, the User (162) may subscribe to a different cellular network, or no cellular network. In one or more embodiments of the invention, the User (162) may be a corporation or business. Alternatively, the User (162) may be an individual or a computing device capable of interfacing as an individual (e.g. a neural network, artificial intelligence). In one or more embodiments of the invention, the Web Interface (132) may have different functionalities enabled based on whether a user is an administrator. The Web Interface (132) may enable an administrator to establish Bulk Business Rules (134), such as blackout times (i.e. times when messages will not be sent out), a throughput restriction, such as three messages a second, and various other rules or limitations on sending bulk messages. It will be apparent to one of ordinary skill in the art that this is not an exhaustive listing of potential business rules and, accordingly, the invention should not be limited to the above examples. Additionally, the Web Interface (132) may enable a standard user to submit a request to send a bulk message.

The Bonus on incoming Call (BIC) Service (140) is also a value added service that may be built onto and/or interact with the framework of the SDP (110) (or any other framework suitable for supporting such a service), and includes the BIC Business Rules (142). In one or more embodiments of the invention, the BIC Service (140) is communicatively connected to the Network Elements (102), and is communicatively connected with all components of the SDP (110). The BIC Service (140) may include a data repository (not shown) or may use a data repository associated with the SDP (110). In one or more embodiments of the invention, the BIC Service (140) may execute on its own server, computer, laptop, node, or other suitable device. Alternatively, the BIC Service (140) may execute on the same device as SDP (110).

In one or more embodiments of the invention, BIC Service (140) is configured to determine whether a mobile device receiving an incoming call qualifies for a bonus, and apply the bonus to the account associated with the mobile device when the mobile device qualifies for a bonus. In one or more embodiments of the invention, BIC Service (140) may collect bonus parameters about the phone call, such as call length, originating network, and other factors. It will be apparent to one of ordinary skill in the art that this is not an exhaustive list of possible bonus parameters and, as such, the invention should not be limited to the above examples.

The BIC Service (140) may calculate and apply bonuses to subscriber accounts based on the BIC Business Rules (142). The BIC Business Rules (142) may include any rules related to bonuses such as a minimum call duration to be eligible for a bonus, an out of network requirement, and other factors. It will be apparent to one of ordinary skill in the art that this is not an exhaustive list of possible rules and, as such, the invention should not be limited to the above examples. In one or more embodiments of the invention, the bonus may be free text messages, additional minutes, a discount towards a current or future bill, credit, or any other suitable form. It will be apparent to one of ordinary skill in the art that this is not an exhaustive list of possible bonuses and, as such, the invention should not be limited to the above examples. Additionally, the BIC Service (140) may be implemented without the SDP (110), or may be implemented using a SDP provided by a third-party supplier, or other entity. It will be apparent to one of ordinary skill in the art that BIC Service (140) may be implemented on any available SDP or without an SDP and, accordingly, the invention should not be limited to any specific configuration.

The Traffic Regulator Service (150) is also a value added service that may be built onto and/or interact with the framework of the SDP (110) (or any other framework suitable for supporting such a service), and includes Traffic Parameters (152). In one or more embodiments of the invention, the Traffic Regulator Service (150) is communicatively connected to the Network Elements (102), and is communicatively connected with all components of the SDP (110). The Traffic Regulator Service (150) may include a data repository (not shown) or may use a data repository associated with the SDP (110). In one or more embodiments of the invention, the Traffic Regulator Service (150) may execute on its own server, computer, laptop, node, or other suitable device. Alternatively, the Traffic Regulator Service (150) may execute on the same device as SDP (110). The Traffic Regulator Service (150) may also be known as a Network Guard Service.

In one or more embodiments of the invention, the Traffic Regulator Service (150) is configured to regulate traffic on a network. In one or more embodiments of the invention, the Traffic Regulator Service (150) regulates traffic on a network by assessing various characteristics of an incoming call (i.e. Traffic Parameters (152)), and filtering the call based on the characteristics. In conjunction with these call characteristics, the Traffic Regulator Service (150) may further filter calls by assessing the amount of network that is available for extra call load. It will be apparent to one of ordinary skill in the art that this is not an exhaustive list of possible Traffic Regulator Service (150) functionalities and, as such, the invention should not be limited to the above example.

The Traffic Regulator Service (150) may regulate traffic based on the Traffic Parameters (152). The Traffic Parameters (152) may include any parameters related to calls. Examples of Traffic Parameters (152) include the time of the call (e.g. 12:00 pm), the type of call (e.g. voice, SMS, MMS), the location of the call (e.g. local), and the call number (e.g. 415-123-4567). It will be apparent to one of ordinary skill in the art that this is not an exhaustive list of possible parameters and, as such, the invention should not be limited to the above examples. Additionally, the Traffic Regulator Service (150) may be implemented without the SDP (110), or may be implemented using a SDP provided by a third-party supplier, or other entity. It will be apparent to one of ordinary skill in the art that Traffic Regulator Service (150) may be implemented on any available SDP or without an SDP and, accordingly, the invention should not be limited to any specific configuration.

Figure 2:
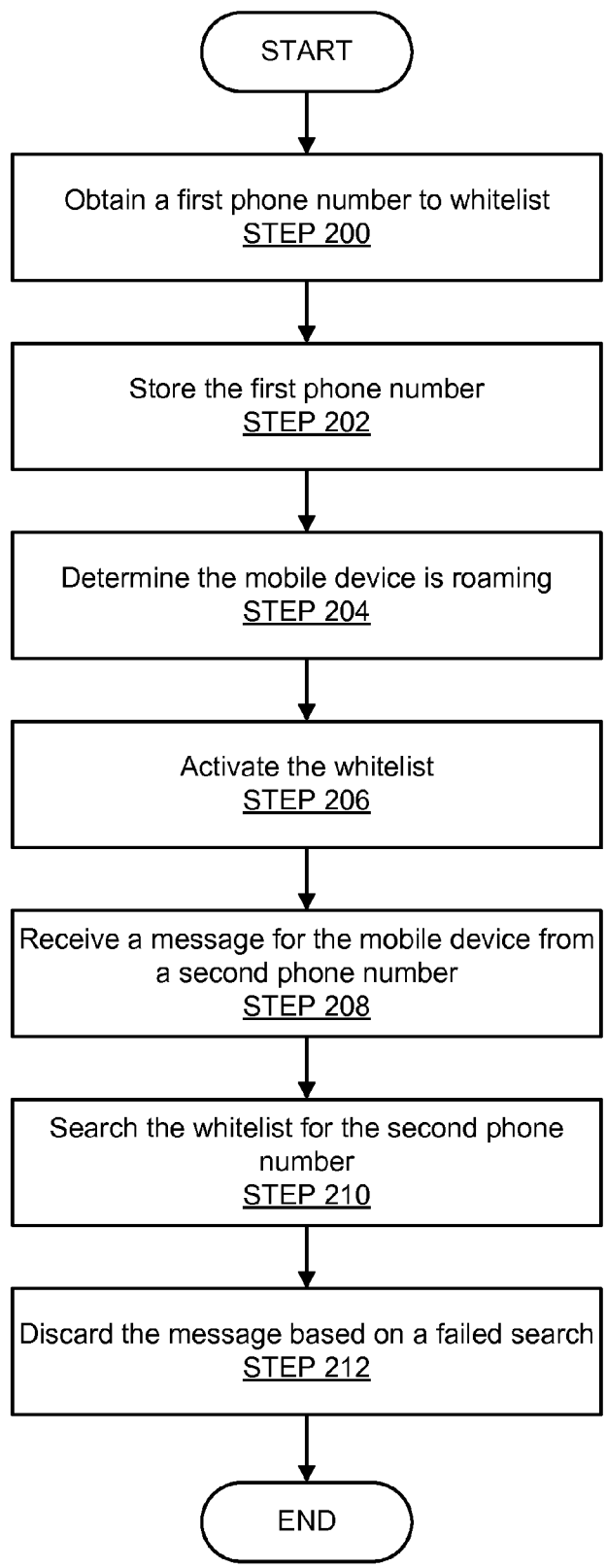
FIG. 2 shows a flowchart of a method for a do not disturb service in accordance with one or more embodiments of the invention.

FIG. 2 shows a flowchart of a method for call screening (e.g. blocking) in accordance with one or more embodiments of the invention. The method of FIG. 2 may be implemented, for example, using the system of FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in STEP 200 a first phone number to whitelist is obtained. In one or more embodiments of the invention, the first phone number may be obtained through a phone or a computer using, for example, a text message, a user interface, or from a telephone call. The first phone number may also be associated with a granularity or directionality, as described earlier. The first phone number is a number the subscriber wishes to allow to contact him or her when the subscriber's mobile device is out of network and/or roaming.

In STEP 202, the first phone number is stored. In one or more embodiments of the invention, the first phone number may be stored in a database associated with the call screening server. Alternatively, a separate database may store the first phone number.

In STEP 204, it is determined that the mobile device is roaming. In one or more embodiments of the invention, this determination may be made using the VLR of an SS7 network. Alternatively, the determination may be made using any other suitable method.

In STEP 206, based on the determination that the mobile device is roaming, the whitelist is activated. When activated, all calls/messages directed to the mobile device associated with the mobile device will be inspected to determine whether or not they are allowed.

In STEP 208, a message is received for the mobile device from a second phone number. In one or more embodiments of the invention, the message may be identified by a server as a message directed towards a mobile device with an active whitelist. The whitelist may automatically activate and/or deactivate without input from the mobile device subscriber. Alternatively, the mobile device subscriber may manually activate and/or deactivate the whitelist. In one or more embodiments of the invention, the message may be an SMS message, an MMS message, a phone call, a voice mail, an instant message or any other suitable form of contact.

In STEP 210, the whitelist is searched for the second phone number. In one or more embodiments of the invention, the whitelist may be searched in any manner known in the art. Additionally, a call screening server may search the list. Alternatively, another device may search the list.

In STEP 212, the message is discarded based on a failed search. In one or more embodiments of the invention, the message is discarded before the mobile device subscriber is aware of the incoming message, and is therefore never disturbed. For example, a call screening server may instruct the cellular network to drop the call. In one or more embodiments of the invention, the steps of FIG. 2 may also be performed for adding numbers to the blacklist, blocking calls from numbers on the blacklist, or any other functionality as described above. In other words, the blacklist may operate in primarily the same manner as the whitelist. A user of the call screening service may switch between an active whitelist and an active blacklist at any time. Further, if an auto feature is enabled, the service may switch between activating a blacklist and whitelist according to various rules that may be determined by the user. Subscribers to the service may also activate or turn off SMS notification of this feature. Those skilled in the art will appreciate that call screening service may be especially beneficially for various segments of the call population, including roamers, women, and children. Those skilled in the art will appreciate that there may be various other functionalities provided by the call blocking service than those described (e.g. add a white list and/or blacklist, remove a number from a whitelist and/or blacklist, show a whitelist, show a blacklist, enable a whitelist, enable a blacklist, begin auto list management, disable all lists, block all numbers, enable notifications, disable notifications).

Figure 3:
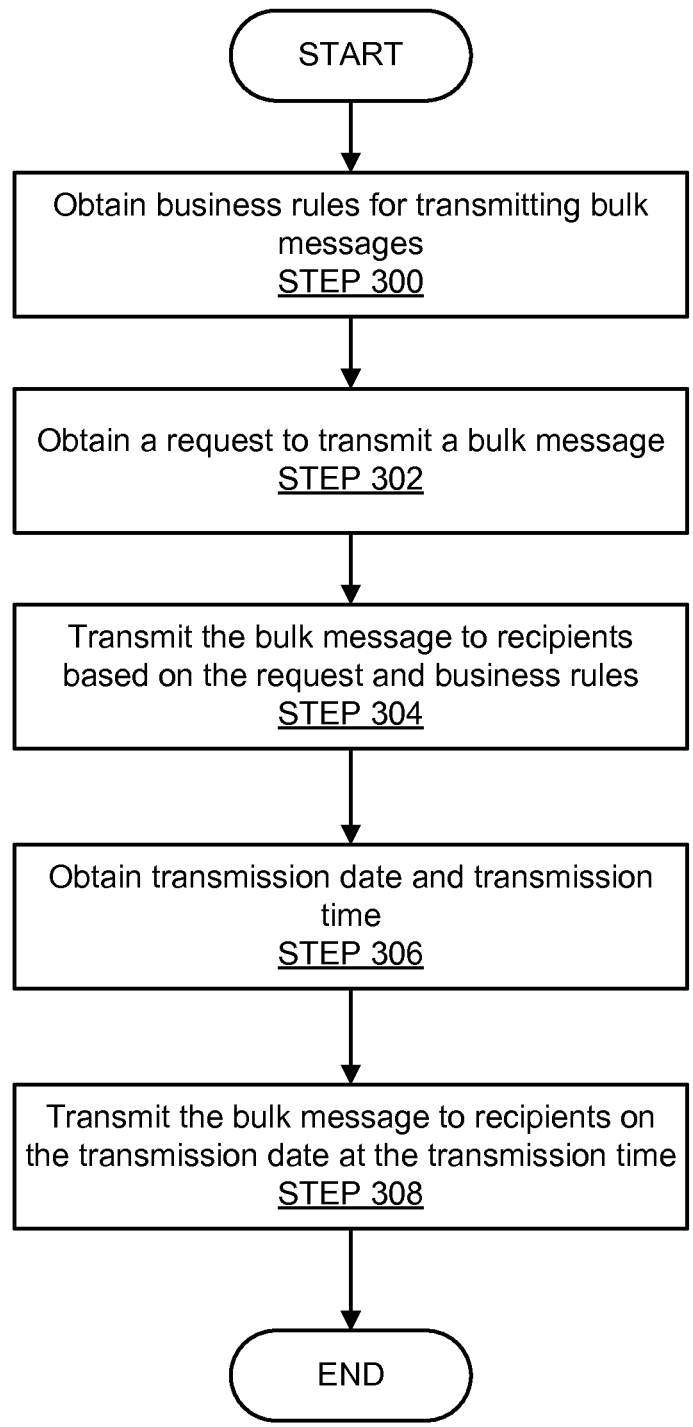
FIG. 3 shows a flowchart of a method for sending bulk messages in accordance with one or more embodiments of the invention.

FIG. 3 shows a flowchart of a method for sending bulk messages in accordance with one or more embodiments of the invention. The method of FIG. 3 may be implemented, for example, using the system of FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in STEP 300, business rules for transmitting bulk messages are obtained. In one or more embodiments of the invention, the business rules may be obtained from a telecom operator through a web interface where the telecom operator logs in as an administrator. Business rules may include, for example, a blackout time when messages will not be sent, blocked numbers, blocked prefixes, white numbers (i.e. numbers which bulk messages may be sent to), white listed destinations (e.g. other operators, international), balance cancellation on expiration, operator supervision required, a throughput restriction, such as three messages per time period (e.g. second, day, month, year), allowed message types (e.g. SMS, Long SMS, Flash SMS, MMS), and other rules. In one or more embodiments of the invention the business rules may be global (i.e. the same for all users of the system), or business rules may be specific to an individual user of the system (e.g. a supervised account or an unsupervised account). Alternatively, the business rules may be a mix of both global and user-account specific.

In STEP 302, a request to transmit a bulk message is obtained. In one or more embodiments of the invention, the request is obtained from a web interface accessed by a user of the bulk messaging system. The request may include the message content to be sent, the recipients to send the message content to, a start date and time, and any other suitable content. It will be apparent to one of ordinary skill in the art that this is not an exhaustive list of content that the request may contain and, as such, the invention should not be limited to the above examples. In one or more embodiments of the invention, the request may be manually entered into the web interface. Alternatively, the request may be uploaded in a variety of formats such as popular word processing document formats, spreadsheet formats, database formats, XML, or any other suitable format.

In STEP 304, the bulk message is transmitted to recipients based on the request and the business rules. The bulk message may be transmitted to the recipients over a cellular and/or IP network, all at the same time, or in groups.

In STEP 306, a transmission date and a transmission time are obtained. The transmission date and transmission time may be obtained from an administrator of the system. The transmission date and transmission time may indicate a date and time in the future when the bulk message is to be transmitted. In other words, the transmission date and transmission time may be obtained from an administrator at an initial date and an initial time, where the transmission date may be the same or later than the initial date, and the transmission time is after the initial time.

In STEP 308, the bulk message is transmitted to recipients on the transmission date at the transmission time. Those skilled in the art will appreciate that the transmission date at the transmission time may also be associated with a recurring date and recurring time. The recurring date and recurring time may indicate that the bulk message is to be transmitted to recipients on the recurring time for a number of periods starting with on recurring date. For example, a bulk message may be sent to recipients every $1^{st}$ day of each month at 12:00 pm. Those skilled in the art will appreciate that there may be various other functionalities associated with transmission of bulk messages that have not been disclosed.

Figure 4:
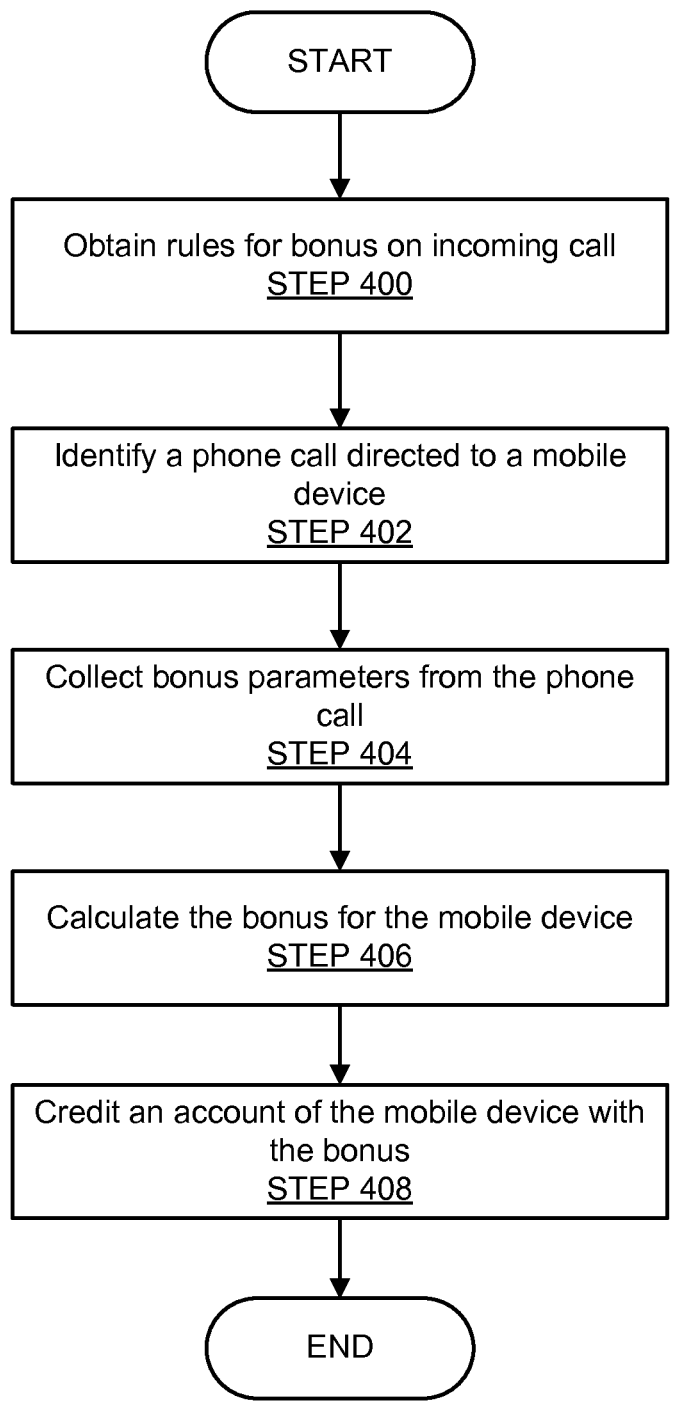
FIG. 4 shows a flowchart of a method for bonuses on incoming calls in accordance with one or more embodiments of the invention.

FIG. 4 shows a flowchart of a method for bonuses on incoming calls in accordance with one or more embodiments of the invention. The method of FIG. 4 may be implemented, for example, using the system of FIG. 1. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, in STEP 400, business rules for bonus on incoming call are obtained. In one or more embodiments of the invention, the business rules may be obtained from a telecom operator through a web interface, manual entry, a phone call, or any other suitable method. The business rules may contain any rules or requirements to receive a bonus on incoming calls, such as a call origination network, a call length duration, a caller party package, an out of network requirement, a frequency requirement, a call start time, or any other suitable rule or requirement. It will be apparent to one of ordinary skill in the art that this is not an exhaustive listing of all possible business rules and, as such, the invention should not be limited to the above examples.

In STEP 402, a phone call directed to a mobile device is identified. In one or more embodiments of the invention, the phone call may be identified in real time by a BIC server. Alternatively, the phone call may be identified after the call is ended. For example, all phone call logs may be checked on a weekly basis and bonuses distributed at that time for the prior week.

In STEP 404, bonus parameters from the phone call are collected. In one or more embodiments of the invention, the bonus parameters may be collected in real time, or may be collected after the phone call has ended. The bonus parameters may be any parameter or data item that is used to calculate whether a bonus is owed, and how much the bonus is.

In STEP 406, the bonus for the mobile device is calculated. In one or more embodiments of the invention, the bonus is calculated using the bonus parameters and the business rules.

In STEP 408, the account associated with the mobile device is credited with the bonus. In one or more embodiments of the invention, the account associated with the mobile device may be credited through the charging system of the cellular network after it was instructed to credit the account by a BIC server. The bonus may take any form, such as free minutes, free text messages, discounts on bills, credit, or any other suitable bonus. It will be apparent to one of ordinary skill in the art that this is not an exhaustive listing of all forms the bonus may take and, as such, the invention should not be limited to the above examples.

Figure 5:
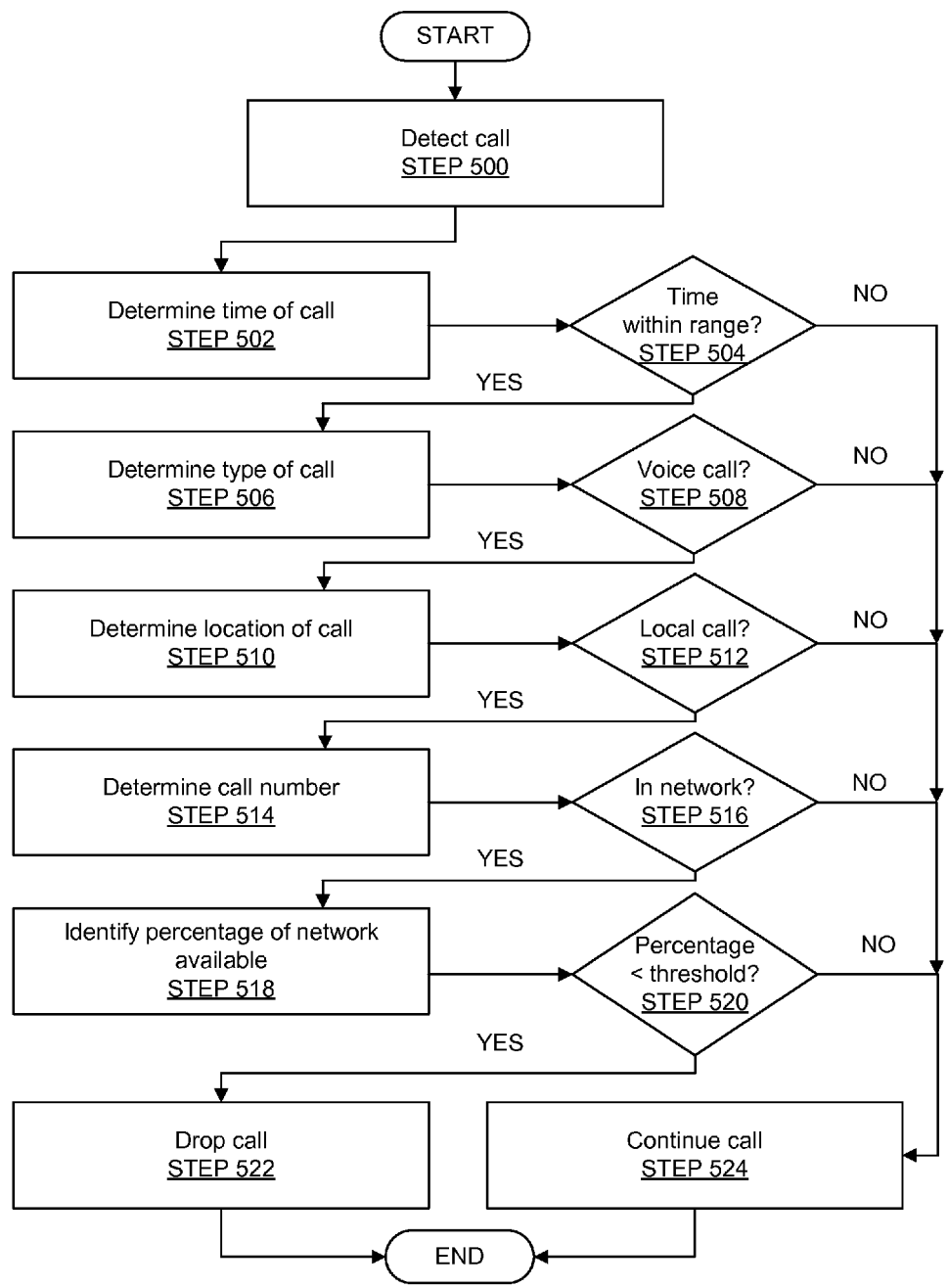
FIG. 5 shows a flowchart of a method for regulating traffic in accordance with one or more embodiments of the invention.

FIG. 5 shows a flowchart of a method for regulating call traffic within a network in accordance with one or more embodiments of the invention. The method of FIG. 5 may be implemented, for example, using the system of FIG. 1. In one or more embodiments of the invention, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

Initially, in STEP 500, a call is detected. The call may be, for example, a voice call originating from a mobile phone within the network directed to another mobile phone within the network. Those skilled in the art will appreciate that there may be many different types of calls.

In STEP 502, a time of the call is determined. The time of the call is when it is made. The time of the call may be, for example, 2:45 pm.

In STEP 504, it is determined if the time of the call is within a specified range of hours. If it is, then the process proceeds to STEP 506, otherwise it proceeds to STEP 524. For example, the range of hours may be 12:00 pm-4:00 pm and 8:00 pm-10:00 pm.

In STEP 506, a type of the call is determined. The type of a call may be, for example, voice, SMS, MMS, video conference, or various other types.

In STEP 508, it is determined if the type of the call is voice. If it is, then the process proceeds to STEP 510, otherwise it proceeds to STEP 524.

In STEP 510, a location of the call is determined. The location may be, for example, within the local area code or an area delineated as local by a network service provider. The location may also be, for example, outside of the local area.

In STEP 512, it is determined if the location of the call is local. If it is, then the process proceeds to STEP 514, otherwise it proceeds to STEP 524.

In STEP 514, a call number is determined. The call number is the number assigned to the mobile phone making the call. The call number may be used to determine, for example, if the mobile phone is within the network.

In STEP 516, it is determined, using the call number, if the call is in network. If it is, then the process proceeds to STEP 518, otherwise it proceeds to STEP 524.

In STEP 518, a percentage of the network that is available is identified. This may be, for example, 25%. In other words, if 25% of the network is available for network traffic, then 75% of the network is not available for network traffic. A threshold for the amount of network available required to drop and/or continue calls may be set by the administrator. For example, the threshold required to continue calls may be 30% (i.e. 30% of the network is required to be available to continue calls). This percentage may also be tied to two counters. A "Total" counter may keep track of all of the users currently on the network, and a "Continue" counter may keep track of the users that are allowed to continue calls.

In STEP 520, it is determined if the percentage of the network that is available is less than a threshold. If it is, then the process proceeds to STEP 522, otherwise it proceeds to STEP 524.

In STEP 522, the call is dropped from the network. The call may be dropped from the network because the percentage of network availability did not meet the required threshold. In this case, only the Total counter is increased, in order to reflect the total number of users attempting to access the network.

In STEP 524, the call is continued in the network. The call may be continued (i.e. forwarded on to its destination) within the network because the percentage of network availability met the required threshold. Alternatively, if the ratio of Total divided by Continue does not exceed the threshold, each counter (i.e. Total and Continue) is incremented, and the call is allowed. The call may also be continued within the network for a specified duration, after which is may be dropped according to network conditions. Further, the call may be forwarded onto another number in the network. There may be specific types of calls that are automatically forwarded on and continued in the network (e.g. out of network calls, non-voice calls, out of time range calls, roaming calls, short number calls). Those skilled in the art will appreciate that there may be various other ways in which calls are handled in a network that have not been described.

Figure 6A:
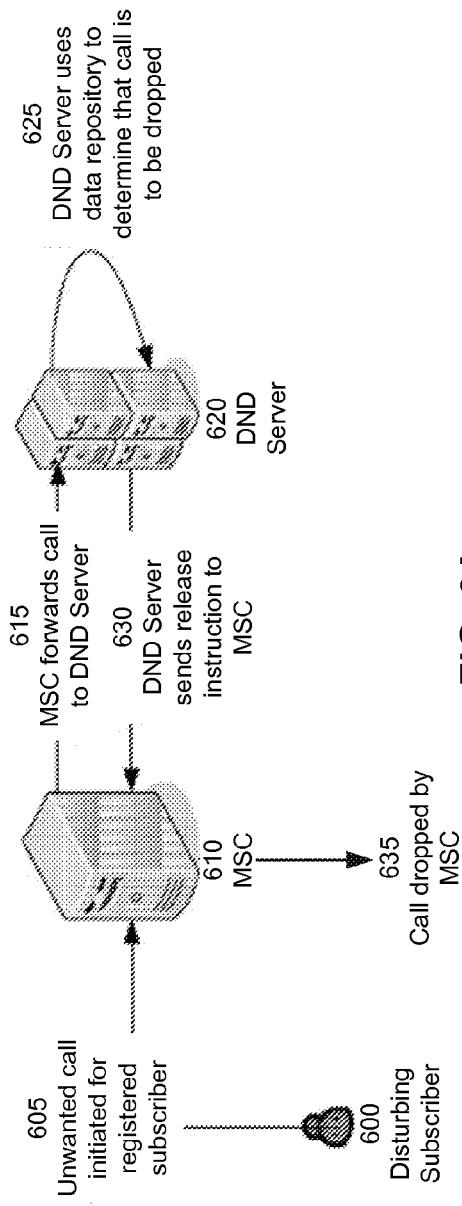
FIG. 6A shows a do not disturb system in accordance with one or more embodiments of the invention.

FIG. 6A shows a do not disturb system in accordance with one or more embodiments of the invention. The elements of FIG. 6A may be implemented, for example, using the system of FIG. 1. In one or more embodiments of the invention, one or more of the elements and/or steps shown in FIG. 6A may be omitted, repeated, and/or performed in a different order than the order shown in FIG. 6A. Accordingly, the scope of the invention should not be considered limited to the specific arrangement of steps shown in FIG. 6A.

In FIG. 6A, a disturbing subscriber (600) initiates an unwanted call for a registered subscriber (605). The unwanted call is transmitted to the Message Service Center (MSC) (610). The MSC (610) forwards the unwanted call (615) to the Do Not Disturb (DND) Server (620). After receiving the unwanted call, the DND Server (620) uses a data repository to determine that the unwanted call is to be dropped (625). Specifically, the DND Server (620) may search for the call number or another associated characteristic of the unwanted call in the data repository (e.g. in a blacklist), and determine that the unwanted call is to be dropped based on its existence in the data repository. After verifying that the unwanted call is to be dropped, the DND Server (620) sends release instructions (630) to the MSC (610). Subsequent to receiving the release instructions from the DND Server (620), the MSC (610) drops the unwanted call (635). Those skilled in the art will appreciate that this description does not limit the potential configuration of the do not disturb system.

Figure 6B:
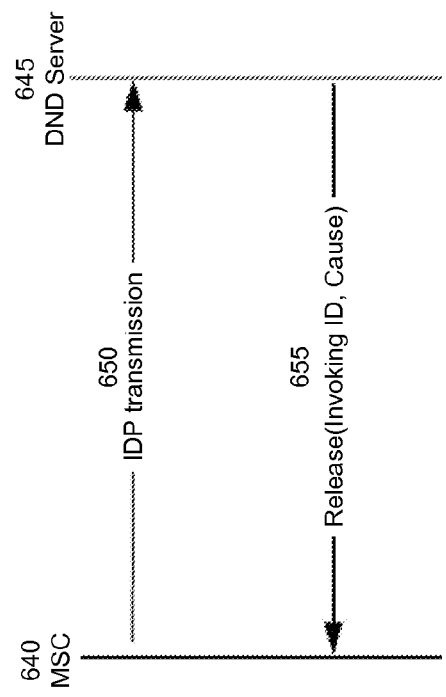
FIG. 6B shows a timeline for a do not disturb system in accordance with one or more embodiments of the invention.

FIG. 6B shows a timeline for a do not disturb system in accordance with one or more embodiments of the invention. The elements of FIG. 6B may be implemented, for example, using the system of FIG. 1. In one or more embodiments of the invention, one or more of the elements and/or steps shown in FIG. 6B may be omitted, repeated, and/or performed in a different order than the order shown in FIG. 6B. Accordingly, the scope of the invention should not be considered limited to the specific arrangement of steps shown in FIG. 6B.

In FIG. 6B, the MSC (640) sends an initial detection point (IDP) transmission (650) to the DND Server (645). The IDP indicates that the unwanted call from the disturbing subscriber is attempting to be transmitted to the registered subscriber. After the DND Server (645) determines that the call is to be dropped, then the DND Server (645) transmits a release instruction (655) to the MSC (640). The release instruction (655) may include an invoking ID (e.g. a unique ID identifying the unwanted call), as well as a cause (e.g. identified in a blacklist) for the release command. Those skilled in the art will appreciate that this timeline does not limit the potential sequence of transmissions of the do not disturb system.

FIG. 7A shows an alternate do not disturb system in accordance with one or more embodiments of the invention. The elements of FIG. 7A may be implemented, for example, using the system of FIG. 1. In one or more embodiments of the invention, one or more of the elements and/or steps shown in FIG. 7A may be omitted, repeated, and/or performed in a different order than the order shown in FIG. 7A. Accordingly, the scope of the invention should not be considered limited to the specific arrangement of steps shown in FIG. 7A.

In FIG. 7A, a regular subscriber (700) initiates a call (705) for a registered subscriber (740). The call is transmitted to the MSC (710), where it is forwarded (715) to the DND Server (720). After receiving the call, the DND Server (720) uses a data repository to determine that the call is to be continued (725). Specifically, the DND Server (720) may search for the call number or another associated characteristic of the call in the data repository (e.g. in a whitelist), and determine that the call is to be continued based on its existence in the data repository. After verifying that the call is to be continued, the DND Server (720) sends continue instructions (730) to the MSC (710). Subsequent to receiving the continue instructions from the DND Server (720), the MSC (710) connects the call (735) to the registered subscriber (740). Those skilled in the art will appreciate that this description does not limit the potential configuration of the do not disturb system.

FIGS. 7B and 7C show timelines for the alternate do not disturb system in accordance with one or more embodiments of the invention. The elements of FIGS. 7B and 7C may be implemented, for example, using the system of FIG. 1. In one or more embodiments of the invention, one or more of the elements and/or steps shown in FIGS. 7B and 7C may be omitted, repeated, and/or performed in a different order than the order shown in FIGS. 7B and 7C. Accordingly, the scope of the invention should not be considered limited to the specific arrangement of steps shown in FIGS. 7B and 7C.

In FIG. 7B, a timeline relating to a roaming prepaid allowed call (745) scenario is described. Initially, the MSC (746) sends the IDP transmission (748) to the DND Server (747), where the DND Server (747) identifies that that call is roaming and prepaid. After identifying this, the DND Server (747) sends IDP transmission (749) back to the MSC (746), in order to begin the charging process. Subsequently, the MSC (746) sends a request to apply charging and connect (750) to the DND Server (747), and the DND Server (747) send back instructions to the MSC (746) to apply charging and connect the call (751), after which the call is connected. After the call has ended, the MSC (746) sends the DND Server (747) a request for an apply charging report and a call info report (752). The apply charging report may indicate how much the call is to be charged, and the call info report may contain various information relating to the call (e.g. call duration, destination, source, network). Subsequently, the DND Server (747) sends the MSC (746) the apply charging report and the call info report (753). Finally, the MSC (746) requests that the DND Server (747) closes the connection created for the call (754), and the DND Server (747) sends instructions to the MSC (746) to close the connection.

In FIG. 7C, the timeline of an allowed call (760) that is not roaming is described. Initially, the MSC (761) sends an IDP transmission (763) to the DND Server (762). Since the call has been qualified as allowed, the DND Server (762) immediately sends instructions to continue the call (764) to the MSC (761), and the MSC (761) subsequently continues the call. Those skilled in the art will appreciate that these timelines does not limit the potential sequence of transmissions of the do not disturb system.

Figure 8:
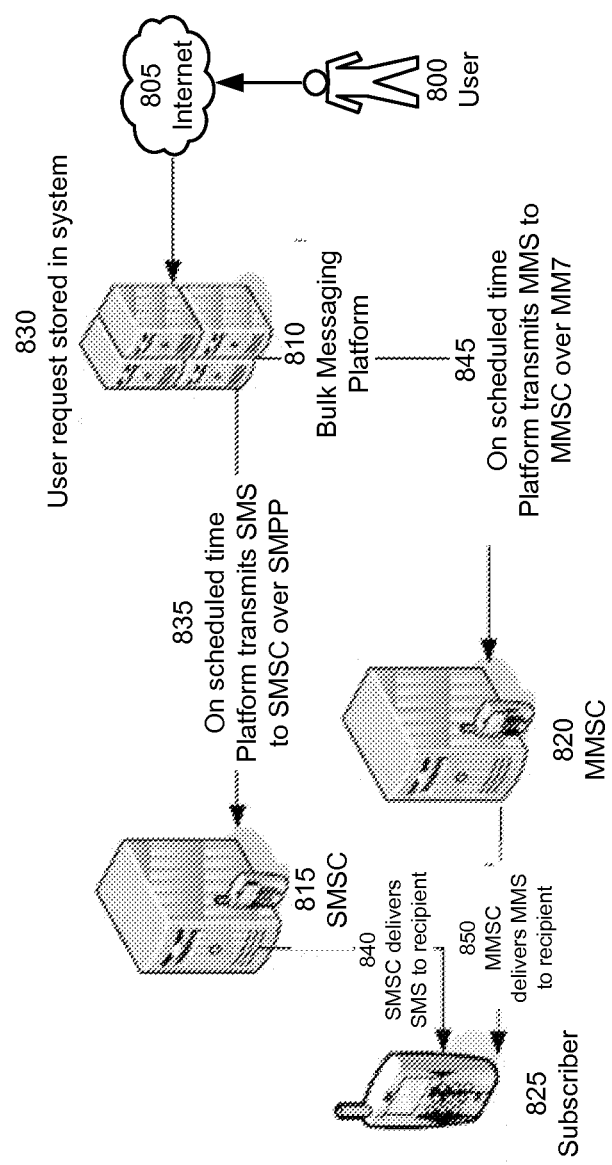
FIG. 8 shows a system for sending bulk messages in accordance with one or more embodiments of the invention.

FIG. 8 shows a system for sending bulk messages in accordance with one or more embodiments of the invention. The elements of FIG. 8 may be implemented, for example, using the system of FIG. 1. In one or more embodiments of the invention, one or more of the elements and/or steps shown in FIG. 8 may be omitted, repeated, and/or performed in a different order than the order shown in FIG. 8. Accordingly, the scope of the invention should not be considered limited to the specific arrangement of steps shown in FIG. 8.

In FIG. 8, a user (800) accesses a Bulk Messaging Platform (810) through the Internet (805). The user (800) initializes a user request, which is stored in the system (830). The user request may indicate characteristics such as a date and/or time, a message to send, and a set of subscribers to send the message to. If the message is a short message service (SMS) message, then on the scheduled time, the Bulk Messaging Platform transmits the SMS to a Short Message Service Center (SMSC) (815), where the SMS is delivered to its intended recipients (840) (e.g. including subscriber (825)). This transmission may occur using short message peer to peer (SMPP) protocol. If the message is a multimedia message service (MMS) message, then on the scheduled time, the Bulk Messaging Platform transmits the MMS to a Multimedia Message Service Center (MMSC) (820), where the MMS is delivered to its intended recipients (850) (e.g. including subscriber (825)). This transmission may occur using the MM7 protocol. Those skilled in the art will appreciate that there may be various other configurations of systems that implement bulk messaging.

Figure 9A:
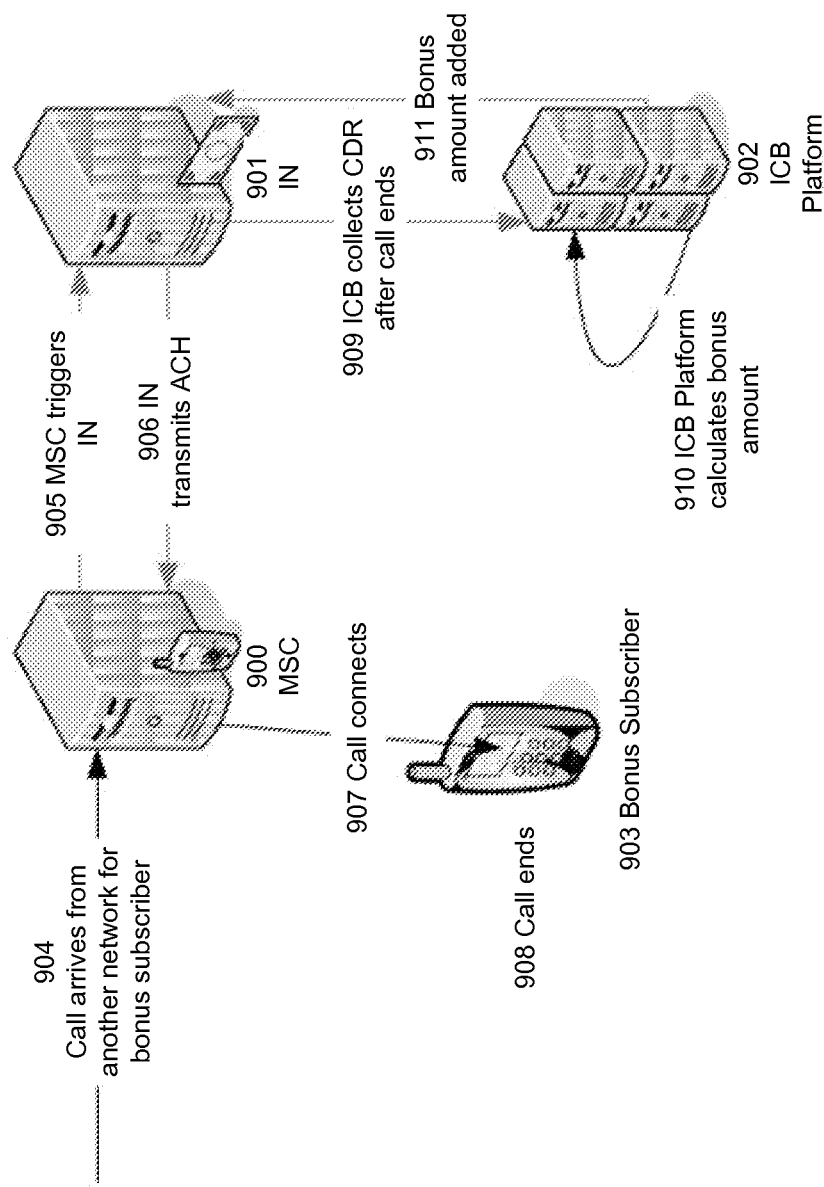
FIGS. 9A, 9B, and 9C show systems for awarding bonuses on incoming calls in accordance with one or more embodiments of the invention.
Figure 9B:
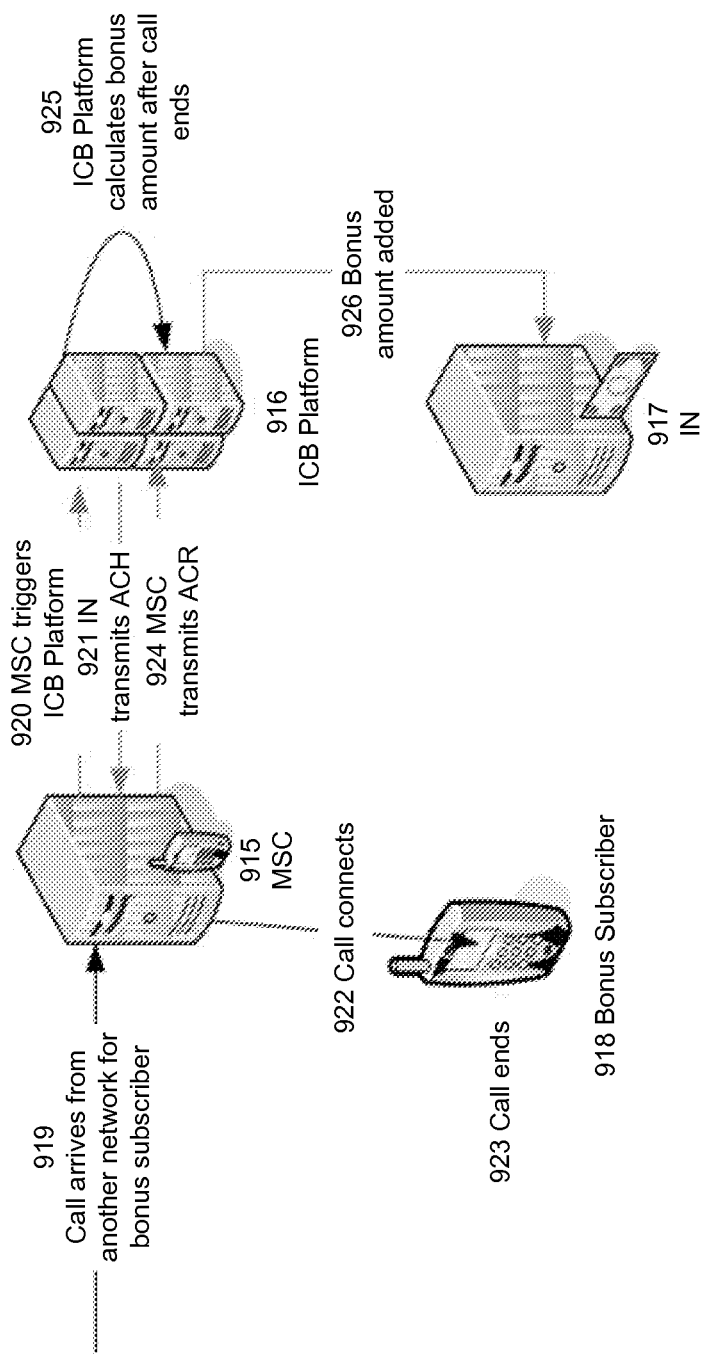
Figure 9C:
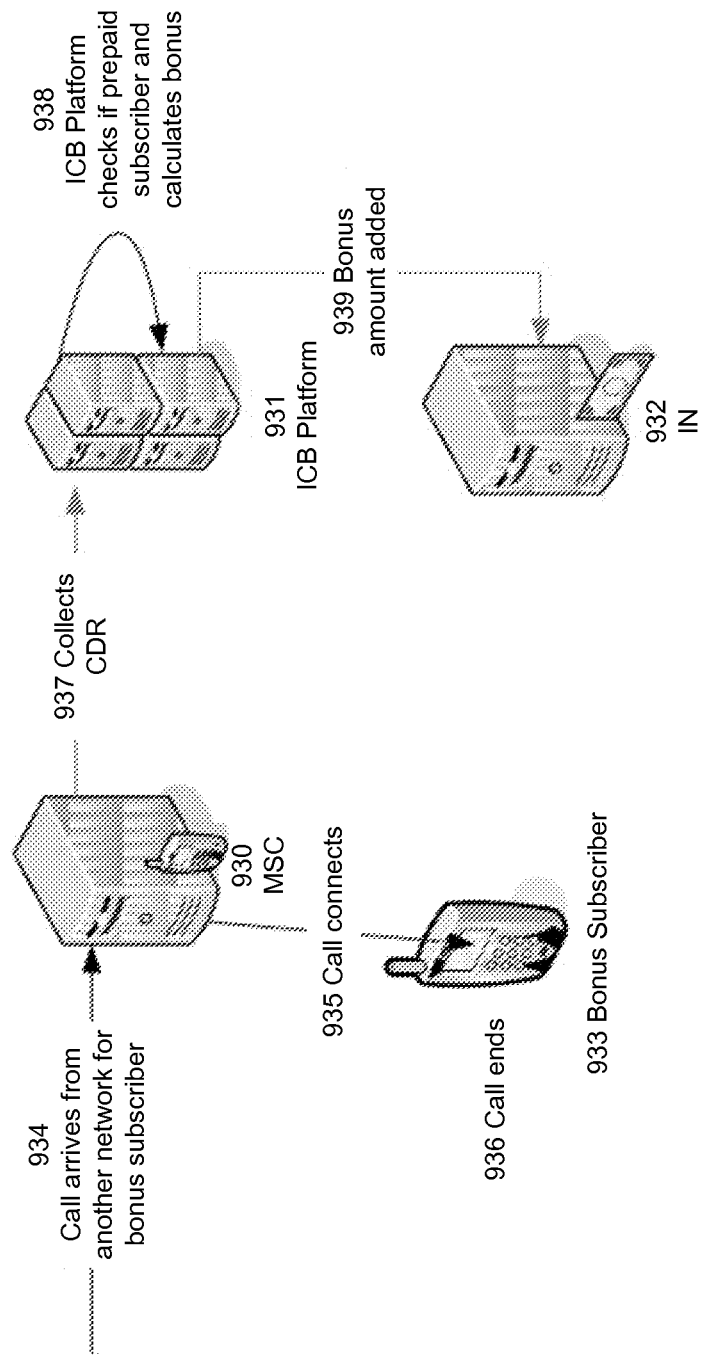

FIGS. 9A, 9B, and 9C show systems for awarding bonuses on incoming calls in accordance with one or more embodiments of the invention. The elements of FIGS. 9A, 9B, and 9C may be implemented, for example, using the system of FIG. 1. In one or more embodiments of the invention, one or more of the elements and/or steps shown in FIGS. 9A, 9B, and 9C may be omitted, repeated, and/or performed in a different order than the order shown in FIGS. 9A, 9B, and 9C. Accordingly, the scope of the invention should not be considered limited to the specific arrangement of steps shown in FIGS. 9A, 9B, and 9C.

In FIG. 9A, a call arrives from another network for a bonus subscriber (904). The call is received by the MSC (900), which triggers (905) an intelligent network (IN) system (901). After receiving an indication that the call has arrived, the IN (901) system transmits an apply charging (ACH) instruction (906) to the MSC (900). Subsequently, the MSC (900) connects the call (907) to the bonus subscriber (903). When the participants hang up, the MSC (900) ends the call (908). After ending the call, the Incoming Call Bonus (ICB) Platform (902) collects the call detail record (CDR) (909). The CDR documents the details of the call. Based on the CDR, the ICB Platform (902) calculates the bonus amount (910) to be applied to the subscribers account. After calculating the bonus amount, the bonus amount is added to the subscriber's account (911).

In FIG. 9B, a call arrives from another network for a bonus subscriber (919). The call is received by the MSC (915), which triggers (920) an ICB Platform (916). After receiving an indication that the call has arrived, the ICB Platform (916) transmits an ACH instruction (921) to the MSC (900). Subsequently, the MSC (900) connects the call (922) to the bonus subscriber (918). When the participants hang up, the MSC (915) ends the call (923). After ending the call, the MSC (915) transmits (924) an apply charging record (ACR) to the ICB Platform (916). The ACR documents the details of the charges for the call. Based on the ADR, and after the call ends, the ICB Platform (916) calculates the bonus amount (925) to be applied to the subscriber's account. After calculating the bonus amount, the bonus amount is added to the subscriber's account (926) using the IN (917) system.

In FIG. 9C, a call arrives from another network for a bonus subscriber (934). The call is received by the MSC (930), which connects the call (935) to the bonus subscriber (933). When the participants hang up, the MSC (930) ends the call (936). Afterwards, the MSC (930) collects and transmits a CDR (937) to the ICB Platform (931). Subsequently, the ICB Platform (931) checks if the call is associated with a prepaid subscriber, and calculates a bonus (938) to be applied to the bonus subscriber's account. After calculating the bonus amount, the bonus amount is added to the bonus subscriber's account (939) using the IN (932) system. Those skilled in the art will appreciate that these configurations do not limit the bonus on incoming calls system from being implemented in other configurations.

FIG. 9D shows a comparison chart for the systems for awarding bonuses on incoming calls in accordance with one or more embodiments of the invention. The elements of FIG. 9D may be implemented, for example, using the system of FIG. 1. In one or more embodiments of the invention, one or more of the elements shown in FIG. 9D may be omitted. Accordingly, the scope of the invention should not be considered limited to the specific elements shown in FIG. 9D.

In FIG. 9D, solutions 1 (i.e. as described in FIG. 9A), 2 (i.e. as described in FIG. 9B), and 3 (i.e. as described in FIG. 9C) are compared. This includes the type of network element, the impacted network element when using the signaling system no. 7 (SS7) protocol, the estimated price impact of a network change for each configuration, the BIC Platform price for each configuration, if additional points of failure may be introduced during a call for each configuration, and the delay in providing a bonus for each configuration. Those skilled in the art will appreciate that there may be various other system configurations beyond those described.

Figure 10:
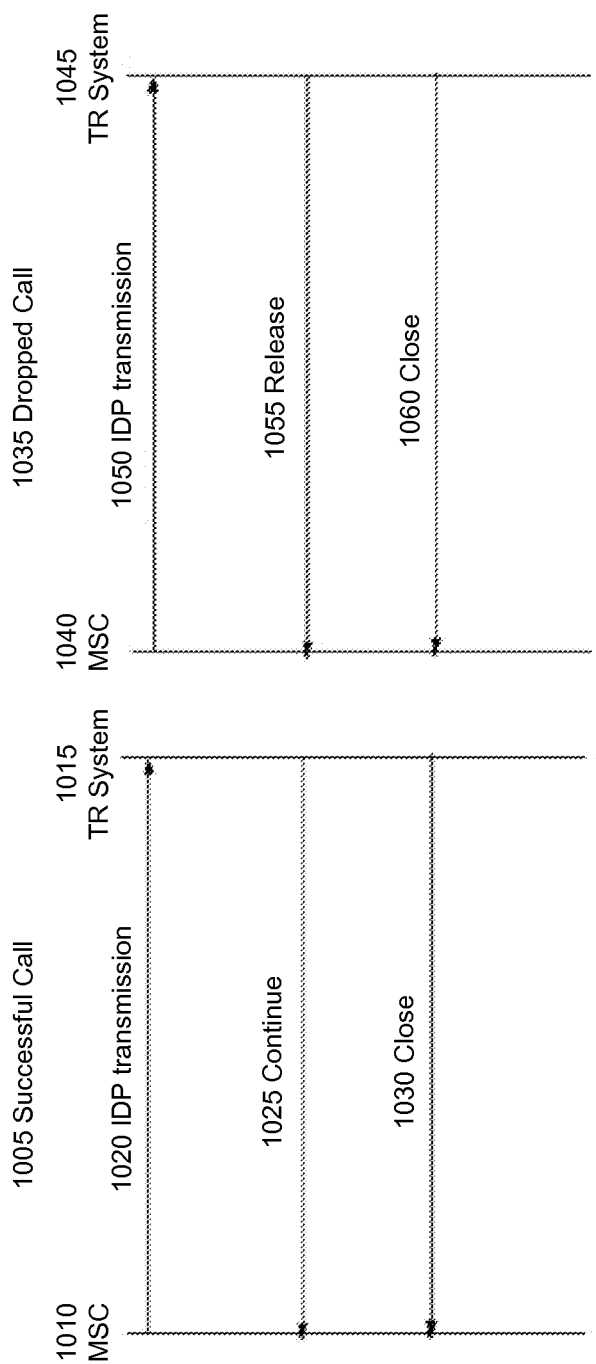
FIG. 10 shows a timeline for a traffic regulator system in accordance with one or more embodiments of the invention.

FIG. 10 shows a timeline for a traffic regulator system in accordance with one or more embodiments of the invention. The elements of FIG. 10 may be implemented, for example, using the system of FIG. 1. In one or more embodiments of the invention, one or more of the elements and/or steps shown in FIG. 10 may be omitted, repeated, and/or performed in a different order than the order shown in FIG. 10. Accordingly, the scope of the invention should not be considered limited to the specific arrangement of steps shown in FIG. 10.

In FIG. 10, the timelines for a successful call (1005) and a dropped call (1035) are shown. In the timeline of a successful call (1005), the MSC (1010) sends an IDP transmission (1020) to a traffic regulator (TR) system (1015). When the TR system (1015) determines that the call is to be continued, the TR system (1015) sends instructions to continue the call (1025) to the MSC (1010). Subsequently, when the call concludes, instructions to close the call are sent from the TR System (1015) to the MSC (1010). In the dropped call (1035) timeline, the MSC (1040) sends an IDP transmission (1050) to the TR system (1045). When the TR system determines that the call is not to be continued, the TR system (1045) sends instructions to release (1055) the call to the MSC (1040). Subsequently, instructions to close the call are sent from the TR System (1015) to the MSC (1010). Those skilled in the art will appreciate that there may be various other timelines associated with the TR system that are not shown in FIG. 10.

Figure 11:
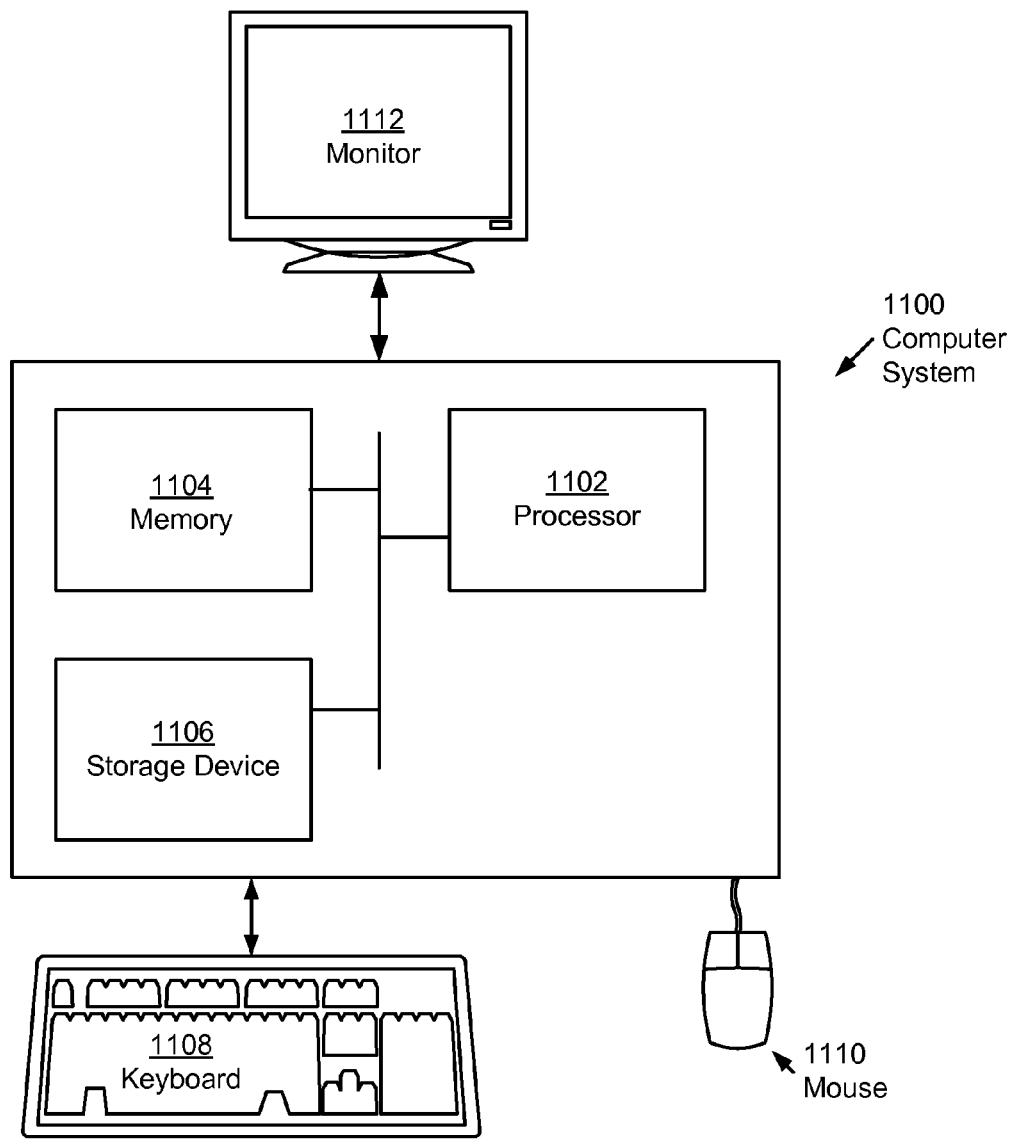
FIG. 11 shows a computer system in accordance with one or more embodiments of the invention.

Embodiments of the invention may be implemented on virtually any type of computer regardless of the platform being used. For example, as shown in FIG. 11, a computer system (1100) includes one or more processor(s) (1102) such as a central processing unit (CPU) or other hardware processor(s), associated memory (1104) (e.g. random access memory (RAM), cache memory, flash memory), a storage device (1106) (e.g. a hard disk, an optical drive such as a compact disk drive or digital video disk (DVD) drive, a flash memory stick), and numerous other elements and functionalities typical of today's computers (not shown). In one or more embodiments of the invention, the processor (1102) is hardware. For example, the processor may be an integrated circuit. The computer system (1100) may also include input means, such as a keyboard (1108), a mouse (1110), or a microphone (not shown). Further, the computer system (1100) may include output means, such as a monitor (1112) (e.g. a liquid crystal display (LCD), a plasma display, or cathode ray tube (CRT) monitor). The computer system (1100) may be connected to a network (1114) (e.g. a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1100) includes at least the minimal processing, input, and/or output means necessary to practice embodiments of the invention.

Further, those skilled in the art will appreciate that one or more elements of the aforementioned computer system (1100) may be located at a remote location and connected to the other elements over a network. Further, embodiments of the invention may be implemented on a distributed system having a plurality of nodes, where each portion of the invention (e.g. network elements, SDP, Do Not Disturb Service, Bulk Messaging Service, BIC Service, Traffic Regulator Service) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for performing a telecommunication service, comprising:
   a cellular network;
   a processor operatively connected to a memory;
   a Service Delivery Platform (SDP) configured to:
      implement the telecommunication service on the cellular network, wherein the telecommunication service is a Bonus on Incoming Call (BIC) Service interacting with the SDP and configured to calculate and apply the bonus on incoming calls;
   an Incoming Call Bonus (ICB) Platform configured to:
      obtain a plurality of business rules for receiving bonuses on incoming calls;
      collect a plurality of bonus parameters from a phone call, wherein the plurality of bonus parameters comprises a call length; and
      calculate a bonus for a mobile device based on the plurality of business rules and the plurality of bonus parameters;
   a Message Service Center (MSC) configured to:
      identify the phone call directed to the mobile device, wherein the mobile device is eligible to receive bonuses on incoming calls; and
   an Intelligent Network (IN) configured to:
      credit an account of the mobile device with the bonus.

2. The system of claim 1,
   wherein the ICB Platform is further configured to:
      identify an origination network of the phone call, wherein the plurality of bonus parameters comprises the origination network; and
      calculate the bonus for the mobile device based on the origination network; and
   wherein the IN is further configured to:
      credit the account of the mobile device with the bonus.

3. The system of claim 1,
   wherein the ICB Platform is further configured to:
      identify a call time of the phone call, wherein the plurality of bonus parameters comprises the call time;
      determine that the call time falls within a time range; and
      calculate the bonus for the mobile device based on the call time falling within the time range; and
   wherein the IN is further configured to:
      credit the account of the mobile device with the bonus.

4. A method for performing a telecommunication service, comprising:
   identifying, on a Service Delivery Platform (SDP) and by a processor, the telecommunication service;
   selecting, on the SDP and by the processor, the telecommunication service; and
   executing, on the SDP and by the processor, the telecommunication service on a cellular network,
   wherein the SDP is configured to implement the telecommunication service on the cellular network,
   and wherein executing the telecommunication service comprises:
      obtaining, by the processor, a plurality of business rules for receiving bonuses on incoming calls;
      identifying, by the processor, a phone call directed to a mobile device, wherein the mobile device is eligible to receive bonuses on incoming calls;
      collecting, by the processor, a plurality of bonus parameters from the phone call, wherein the plurality of bonus parameters comprises a call length;
      calculating, by the processor, the bonus for the mobile device based on the plurality of business rules and the plurality of bonus parameters; and
      crediting an account of the mobile device with the bonus.

* * * * *